US006121891A

United States Patent [19]

Hwang

[11] Patent Number: 6,121,891

[45] Date of Patent: Sep. 19, 2000

[54] PASSIVE PROXIMITY TRANSCEIVER HAVING AN IMPROVED CASING

[76] Inventor: Shih-Ming Hwang, 17811 Sky Park Cir., Suite D & E, Irvine, Calif. 92614

[21] Appl. No.: 09/083,197

[22] Filed: May 22, 1998

[51] Int. Cl.[7] .......... G06F 7/04

[52] U.S. Cl. .......... 340/825.31; 307/10.2; 307/10.3

[58] Field of Search .......... D10/106; 307/10.5; 340/825.31

[56] References Cited

U.S. PATENT DOCUMENTS

| | | | |
|---|---|---|---|
| D. 333,634 | 3/1993 | Issa | D10/106 |
| D. 333,636 | 3/1993 | Issa | D10/106 |
| D. 333,795 | 3/1993 | Issa | D10/106 |
| D. 347,190 | 5/1994 | Issa | D10/106 |
| D. 350,494 | 9/1994 | Hwang | D10/106 |
| 5,519,376 | 5/1996 | Iijima . | |
| 5,635,900 | 6/1997 | Hasegawa et al. . | |
| 5,675,490 | 10/1997 | Bachhuber . | |
| 5,684,454 | 11/1997 | Nishioka et al. . | |
| 5,708,307 | 1/1998 | Iijima et al. . | |
| 5,973,412 | 10/1999 | Nantz et al. | 307/10.5 |

*Primary Examiner*—Michael Horabik
*Assistant Examiner*—Alton Hornsby, III
*Attorney, Agent, or Firm*—Bacon & Thomas, PLLC

[57] ABSTRACT

The casing of a passive proximity transceiver includes a protrusion which extends from the main body of the casing to prevent metal objects from touching the main body, where they would otherwise be close enough to interfere with reception of signals transmitted between the passive proximity transceiver and another electronic device. The casing may be arranged to be mounted on a key ring, with the protrusion being in the form of a collar extending around the main body.

5 Claims, 2 Drawing Sheets

FIG. 2C
(PRIOR ART)
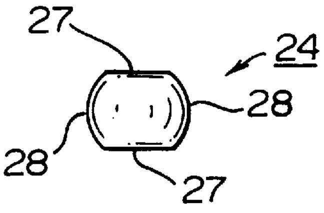
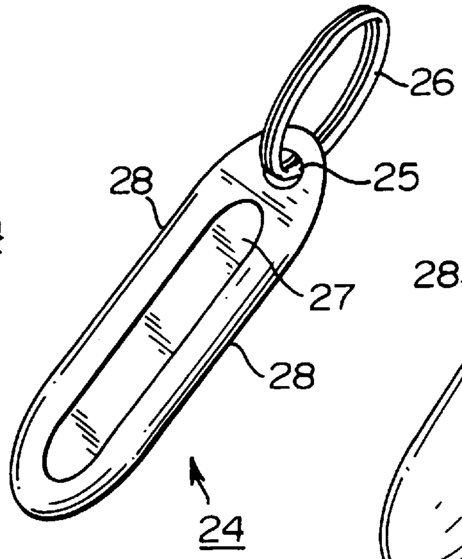
FIG. 2B
(PRIOR ART)
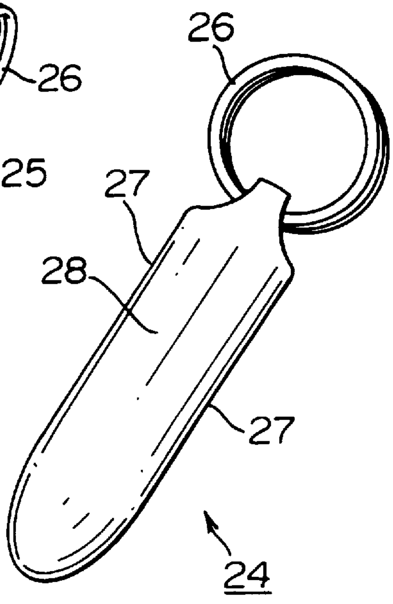
FIG. 2A
(PRIOR ART)
FIG. 3
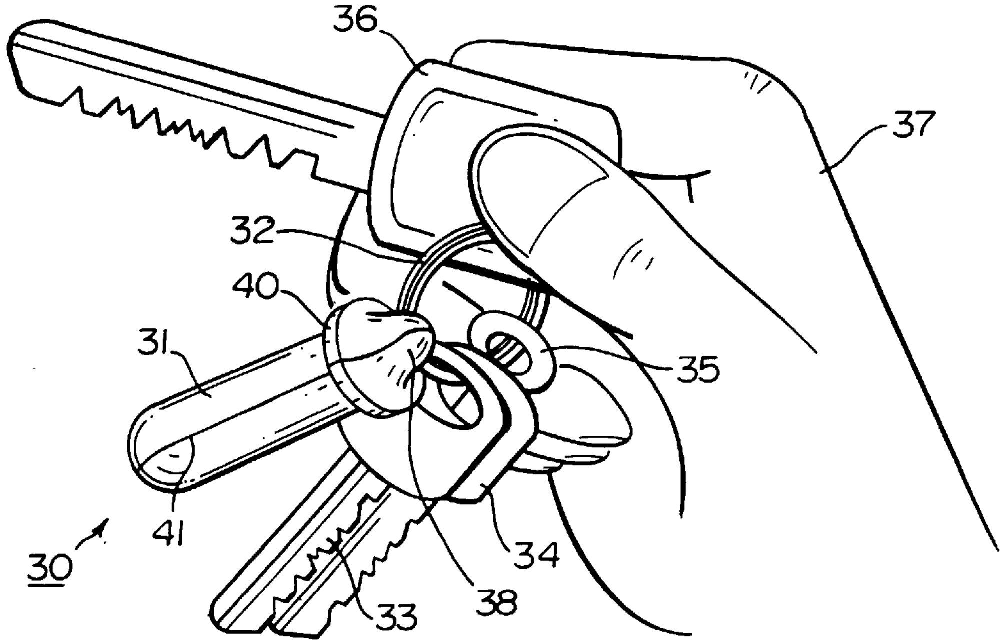

PASSIVE PROXIMITY TRANSCEIVER HAVING AN IMPROVED CASING

BACKGROUND OF THE INVENTION

1. Field of the Invention

The present invention relates to a passive proximity transceiver device of the type used vehicle security systems, and in particular to the casing of such a passive proximity transceiver device.

2. Description of Related Art

Passive proximity transceivers are commonly used in security and convenience systems where it is necessary or desirable for some sort of electronic device to receive some sort of input from a user without requiring the user to perform a specific action. For example, in a vehicle security system that immobilizes the engine's starter, fuel pump, ignition, or other vital circuit, a passive proximity transceiver associated with or connected to the driver's ignition key can be used to send a disarm signal to the security system in response to a query signal from the security system when the driver inserts the ignition key and thereby brings the passive proximity transceiver into proximity with a corresponding transceiver mounted near the ignition switch. The driver is thus able to provide an input to the security system without having to perform any action other than the normal action of placing the key into the ignition in preparation for starting the vehicle. Similarly, the proximity transceiver could be used to send a disarm or other signal to the security system when a key to the door of the vehicle is inserted into a door lock.

In another situation, someone driving up to a gasoline pump in order to purchase gasoline might trigger an infrared or other sensor. The sensor would in turn trigger an electronic device within the gasoline pump to send a query signal to the passive proximity transceiver attached to the driver's key chain. In response, the passive proximity transceiver should send a coded RF signal to the electronic device, causing that device to allow gasoline to be pumped and the cost of the gasoline to be charged to the driver's credit card, the account information for which had been previously programmed into a computer system attached to the electronic device.

The construction of a typical proximity transceiver 1 is illustrated in FIG. 1. The proximity transceiver 1 is designed to be carried by a person and to transmit a coded signal in response to receipt of a corresponding coded signal from transmitter/encoder circuitry 2 mounted, for example, near the door lock or ignition switch of a vehicle, or some other electronic device. Typically, the proximity transceiver 1 includes receiver/decoder circuitry 3 made up of an RF receiver 4, demodulator 5, and comparator 6 for comparing a code extracted from the received signal with a preset code, generated by the decoder circuitry or retrieved from a memory or register, represented by functional block 7. If the extracted code matches the pre-set code, then the transmitter/encoder circuitry 8 is activated to generate a coded signal by using an RF modulator 9 to impress a further code 10 on the RF carrier generated by functional block 11, and a transmitter 12 to transmit the resulting coded signal to a receiver 13 in the electronic device receive/decoder circuitry 2.

The transmitter 12 and other circuitry in the proximity transceiver 1 are powered by a low voltage battery, and the range of the transmitter is on the order of a few inches, so that the transmitted signal is received by the receiver/decoder circuitry 2 only if the proximity transceiver is very close to the receiver 13 of the receiver/decoder circuitry 2. The receiver/decoder circuitry 2 also includes a demodulator 14 for demodulating the coded signal received from the proximity transceiver 1 and comparison circuitry 15, which may be a separate component or part of the controller 16 of a security system or other electronic device 17. Circuitry 15 compares the extracted code with a code generated or retrieved from functional block 18 and, if the codes match, enables the controller 15 to perform a function such as authorizing pumping of gasoline or disarming a security system. The transmitter/encoder circuitry 19 which transmits the initial coded signal that activates the proximity transceiver 1 typically also includes a code generator or source of pre-set codes 20, an oscillator 21 for generating a carrier wave, a modulator 22, and a transmitter 23, and is itself activated by the controller 16 upon receipt by the controller of an input from the security system or other electronic device 17, for example upon turning of a key in a lock.

The transceiver circuitry of the conventional proximity transceiver is enclosed in a case 24, shown in perspective in FIGS. 2A and 2B, and in an end view in FIG. 2C. Case 24 completely encloses the proximity transceiver circuitry, and includes an opening 25 for a key ring 26, so that the proximity transceiver can easily be carried by the user. Conventionally, the casing has the general form of a regular solid such as a parallelpiped, ellipsoid, cylindroid so as take up a minimal amount of space, with a smooth outer surface that makes it easy to grasp, although the shape can include features such as the inclusion of both flat surfaces 27 and curved surfaces 28, the invention being intended to apply to all such conventional casings.

The problem addressed by the present invention is that any metal-containing object in proximity with the transceiver, such as keys held on the same key ring as the transceiver, particularly if the key ring holds keys other than the key being inserted into the ignition or lock with which the transceiver is associated, will interfere with transmission or receipt of the coded signals, causing a drastic reduction in range, or completely preventing a transmission from being received. In order to ensure proper transmission and receipt of signals, as wide a gap as possible must be maintained between the passive proximity transceiver and any metal objects. At present, the only way to maintain such a gap is either for the user to hold the transceiver away from the other keys, or to use a larger case. Having the user manipulate the transceiver defeats the purpose of the transceiver, which is to provide a coded input that does not require user intervention, while making the case larger makes it inconvenient to carry and increases the cost of the device.

SUMMARY OF THE INVENTION

It is accordingly a principal objective of the invention to provide a passive proximity transceiver arranged to ensure that a sufficiently wide gap is present between electronic circuitry in the transceiver and any adjacent metal objects, to prevent the metal objects from interfering with transmissions to or from the transceiver while minimizing the size of the casing.

This objective is achieved, in accordance with the principles of a preferred embodiment of the invention, by including a protrusion which extends from the case of the passive proximity transceiver so as to prevent metal objects from touching the main body of the case, where they would otherwise be close enough to interfere with transmissions.

In one example of the preferred transceiver, the casing is arranged to be mounted on a key ring, and the protrusion is a collar extending around the main body of the casing and molded together with the main body, although the protrusion could also be formed separately from the main body.

BRIEF DESCRIPTION OF THE DRAWINGS

FIGS. 2A and 2B are perspective views showing the casing of a conventional passive proximity transceiver.

FIG. 2C is an end view of the casing illustrated in FIGS. 2A and 2B.

FIG. 3 is a perspective view showing a proximity transceiver constructed in accordance with the principles of a preferred embodiment of the invention.

DETAILED DESCRIPTION OF THE PREFERRED EMBODIMENTS

Figure 1:
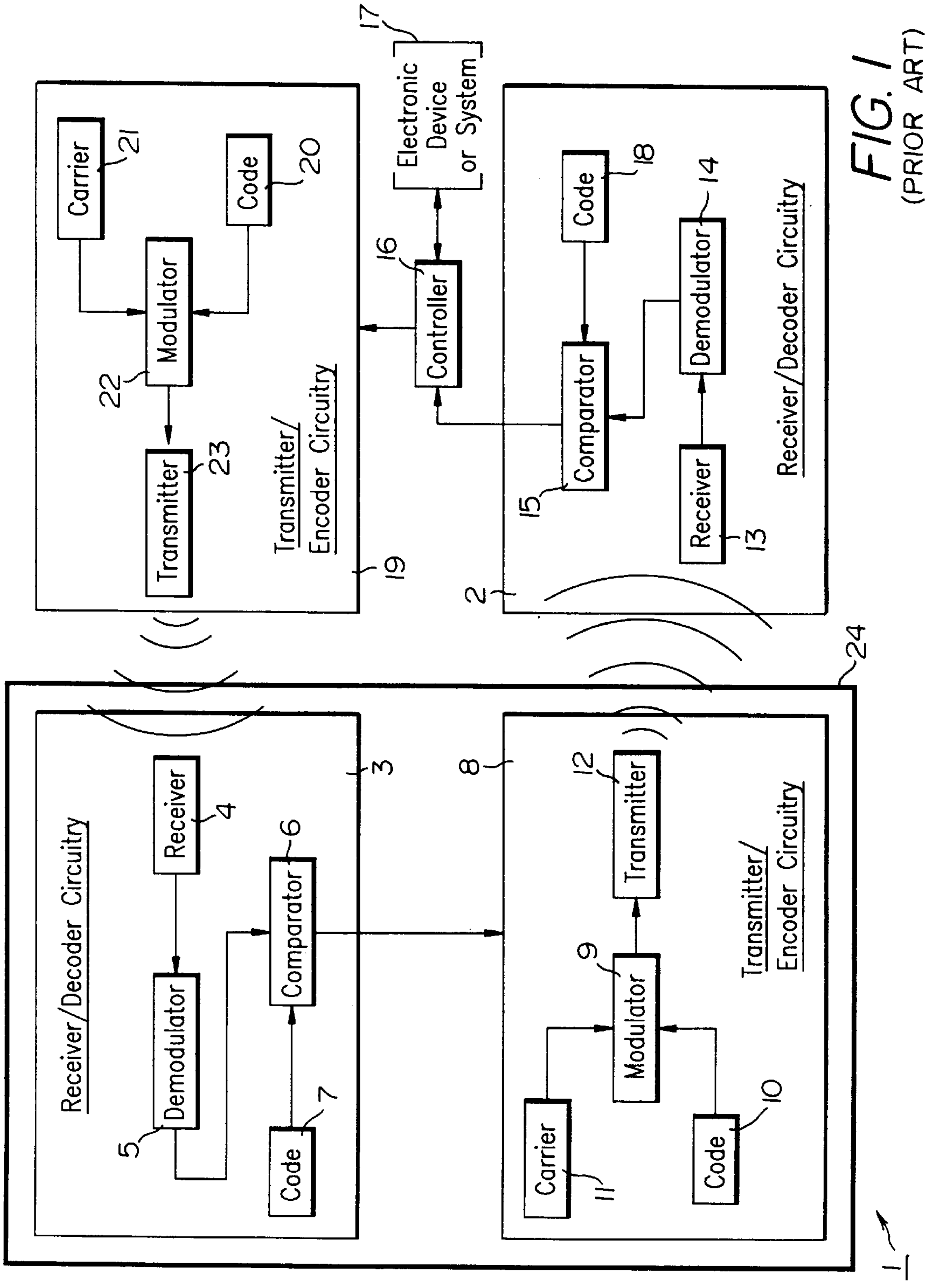
FIG. 1 (PRIOR ART)
FIG. 1 is a functional block diagram illustrating the operation of a conventional passive proximity transceiver.

As illustrated in FIG. 3, the proximity transceiver 30 of the preferred embodiment includes a main body 31 having a regular shape which, in the illustrated example is generally cylindrical or ellipsoid, but which could have other shapes, including cylinders or ellipsoids having both curved and planar surfaces, so long as the main body is large enough to accommodate the transceiver electronics but otherwise as small as possible so as to fit unobtrusively on a key ring 32 together with the additional metal keys 33–36, and to be easily handled, with some variation in the shape and size being permitted for aesthetic reasons.

As illustrated in FIG. 3, the key ring is in the position it would be in when the user, represented by hand 37, inserted one of the keys 36 in a key hole or vehicle ignition. On the other hand, the principles of the invention are also applicable to proximity transceivers in which the transceiver might be brought into proximity with an electronic device without requiring a key to be inserted, as in the above described gasoline pump example.

In this embodiment, one end 38 of the main body 31 includes an opening through which the key ring 32 extends, although the invention is not limited to a particular means for attaching a key ring, or other holder, or to any particular type of key ring or holder.

The improvement over the conventional passive proximity transceiver is provided in this embodiment by a collar or rib 40 extending around the main body 31. In this position, other keys on the key ring are unable to come closer to the transceiver components within the casing than is permitted by the collar, and thus the collar serves as a means for preventing metal in keys from interfering with transmissions involving the transceiver while still allowing the size of the case to be minimized so that the main body of the transceiver case is within the zone of substantial interference.

Although the interference prevention means of the preferred embodiment is illustrated as a collar, the collar could be replaced by multiple ribs or other protrusions or projections from the casing, either extending circumferentially around one slice of the casing as in the illustrated example, or extending over a larger part of the casing. The present invention is intended to cover any protrusions which increase the distance of adjacent metal objects from components in the transceiver, relative to the distance that the metal objects would be at if the protrusion were not present, so that the metal objects do not cause interference that would otherwise occur if the protrusion were not present.

It will be appreciated that the protrusion, as with the remainder of the casing, may be made of any nonconductive material that will not interfere itself interfere with transmissions, with plastic being one example of such a material. In addition, the protrusion or protrusions may be molded integrally with any portion of the main body, or formed separately from the main body. If formed separately, the protrusion could be included in an end cap which also includes the opening for key ring 32. Alternatively, the casing could optionally be in the form of two pieces joined along line 41 and secured by adhesive to seal the transceiver components within the casing, with the protrusion being integrally molded with the two casing halves. Neither the material nor the construction of the casing, except for the shape of the protrusion, is critical to the invention and thus these elements may be varied without departing from the scope of the invention.

Finally, the passive proximity transceiver electronics form no part of the present invention, the example shown in FIG. 1 being illustrative in nature and not intended to be limiting in any way, except to the extent that the invention concerns a passive proximity transceiver and not some other type of electronic device.

Having thus described a preferred embodiment of the invention in sufficient detail to enable those skilled in the art to make and use the invention, it will therefore nevertheless be appreciated that numerous variations and modifications of the illustrated embodiment may be made without departing from the spirit and scope of the invention, and that the invention is intended to include all such variations and modifications. As a result, it is intended that the invention not be limited by the above description or accompanying drawings, but that it be defined solely in accordance with the appended claims.

I claim:

1. A passive proximity transceiver, comprising:

electrical components arranged to transmit or receive signals from an electrical device when the passive proximity transceiver is within a predetermined distance from the electrical device;

a casing having a main body substantially surrounding said electrical components, said main body having dimensions such that metal objects touching said main body would interfere with reception of said signals by said transceiver components or said electrical device; and at least one protrusion extending outwardly from said main body, said protrusion being arranged to prevent the metal objects from touching any portion of said main body except said protrusion, and thereby to prevent the metal objects from interfering with said reception of said signals.

2. A passive proximity transceiver as claimed in claim 1, wherein said main body includes an end portion arranged to be attached to a key ring, said protrusion being arranged to prevent keys on the key ring from touching said main body and interfering with said reception of said signals.

3. A passive proximity transceiver as claimed in claim 2, wherein said main body is generally cylindrical or ellipsoid in shape, and said protrusion is a collar extending around said main body.

4. A passive proximity transceiver as claimed in claim 1, wherein said main body is generally cylindrical or ellipsoid in shape, and said protrusion is a collar extending around said main body.

5. A passive proximity transceiver as claimed in claim 1, wherein said casing is a plastic casing, and said protrusion is molded integrally with at least a portion of said main body.

* * * * *